(12) United States Patent
Knapp et al.

(10) Patent No.: US 12,541,383 B2
(45) Date of Patent: *Feb. 3, 2026

(54) INTERPLAY BETWEEN DIGITAL ASSISTIVE TECHNOLOGY

(71) Applicant: Microsoft Technology Licensing, LLC, Redmond, WA (US)

(72) Inventors: Jaclyn Carley Knapp, Seattle, WA (US); Lisa Stifelman, Palo Alto, CA (US); André Roberto Lima Tapajós, Greater Manaus (BR); Jin Xu, Suzhou (CN); Steven Dicarlo, Seattle, WA (US); Kaichun Wu, Suzhou (CN); Yuhua Guan, Suzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,384

(22) Filed: Jan. 9, 2024

(65) Prior Publication Data

US 2024/0143356 A1 May 2, 2024

Related U.S. Application Data

(63) Continuation of application No. 17/748,638, filed on May 19, 2022, now Pat. No. 11,922,194.

(51) Int. Cl.
*G06F 9/451* (2018.01)
*G06F 3/16* (2006.01)
*G10L 13/02* (2013.01)

(52) U.S. Cl.
CPC .............. *G06F 9/453* (2018.02); *G06F 3/167* (2013.01); *G10L 13/02* (2013.01)

(58) Field of Classification Search
CPC ............ G06F 9/453; G06F 3/167; G10L 13/02
(Continued)

(56) References Cited

U.S. PATENT DOCUMENTS

| 2013/0080177 A1* | 3/2013 | Chen | G10L 15/183 704/275 |
| 2013/0104029 A1* | 4/2013 | Hendry | G06F 40/117 715/234 |

(Continued)

OTHER PUBLICATIONS

Use Select to Speak—Android Accessibility Help. support.google.com/accessibility/android/answer/7349565?hl=en#:~:text=Open%20your%20device's%20Settings%20app,then%20try%20these%20steps%20again. Accessed May 24, 2019. (Year: 2019).*

*Primary Examiner* — Stephen S Hong
*Assistant Examiner* — Broderick C Anderson
(74) *Attorney, Agent, or Firm* — Ray Quinney & Nebeker P.C.; Paul N. Taylor

(57) ABSTRACT

A method of operating a computing device in support of improved accessibility includes displaying a user interface to an application on a display screen of the computing device, wherein the computing device includes an accessibility assistant that reads an audible description of an element of the user interface; initiating, on the computing device, a virtual assistant that conducts an audible conversation between a user and the virtual assistant through at least a microphone and a speaker associated with the computing device, wherein the virtual assistant is not integrated with an operating system of the computing device; inhibiting an ability of the accessibility assistant to read the audible description of the element of the user interface; and upon transition of the virtual assistant from an active state, enabling the ability of the accessibility assistant.

28 Claims, 11 Drawing Sheets

(58) Field of Classification Search
USPC .......................................................... 715/728
See application file for complete search history.

(56) References Cited

U.S. PATENT DOCUMENTS

2018/0090143 A1* 3/2018 Saddler .................. G10L 13/02
2021/0011557 A1* 1/2021 Lemay .................... G06F 1/163

* cited by examiner

INTERPLAY BETWEEN DIGITAL ASSISTIVE TECHNOLOGY

CROSS-REFERENCE TO RELATED APPLICATIONS

This application claims priority to and the benefit of U.S. Non-Provisional patent application Ser. No. 17/748,638, filed on May 19, 2022, which is hereby incorporated by reference in its entirety.

BACKGROUND

Digital assistive technology ("digital AT") can increase computer access and the computer literacy of many users and, in particular, users experiencing disabilities or literacy challenges. For example, a user experiencing a visual impairment or a literacy challenge may use a screen reader to convert text into speech. In another instance, the same user may give audible commands to a voice assistant that processes the commands to generate lists, enter appointments in a calendar, play music, perform searches, etc.

Interferences, however, may occur when two or more digital ATs operate at the same time. For example, if a screen reader is audibly reciting content while a virtual assistant is monitoring for verbal commands, then a conversation loop may occur in which the virtual assistant accepts the recited content derived from the screen reader as verbal command from a user. This conversation loop may have unintended consequences. For example, the virtual assistant may perform an action in accordance with the output derived from the screen reader.

It is with respect to this general technical environment that aspects of the present disclosure have been contemplated. Although a general environment is discussed, it should be understood that the subject matter claimed herein is not limited to embodiments that solve any disadvantages or that operate only in the environments described above.

BRIEF SUMMARY

Improved interplay between digital assistive technology is described. More specifically, various embodiments of the present technology include systems and methods for inhibiting, adapting, or otherwise manipulating the audio output of a first AT when a second AT is operating at the same, or substantially the same, time. The described systems and methods are particularly suitable for supporting third-party AT functioning as the second AT. For example, the second AT may detect the first AT is launched, executing, active, and/or otherwise operating and begin inhibiting audio output of the first AT. The second AT may then guide a user through a bi-directional and/or curated voice conversation without interference from the first AT. When the second AT transitions from an active state (e.g., into an inactive state or termination state), the second AT may restore the audio output of the first AT.

A method of operating a computing device in support of improved accessibility includes displaying a user interface to an application on a display screen of the computing device, wherein the computing device includes an accessibility assistant that reads an audible description of an element of the user interface; initiating, on the computing device, a virtual assistant that conducts an audible conversation between a user and the virtual assistant through at least a microphone and a speaker associated with the computing device, wherein the virtual assistant is not integrated with an operating system of the computing device; inhibiting an ability of the accessibility assistant to read the audible description of the element of the user interface; and upon transition of the virtual assistant from an active state, enabling the ability of the accessibility assistant.

In certain implementations, an application (e.g., a voice AT) utilizes the second AT to guide a user through a bi-directional and/or curated voice conversation. The application and/or second AT may determine that the first AT is launched, executing, active, and/or otherwise operating. The application and/or second AT may then begin inhibiting, adapting, or otherwise manipulating the audio output of the first AT. The application and/or the second AT may then engage in a curated conversation with a user without interference from the first AT. When the application and/or the second AT transitions from an active state (e.g., into an inactive state or termination state), the application and/or the second AT may restore the audio output of the first AT.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additionally, the use of the terms "first" and "second" herein are for descriptive purposes only and are not intended to indicate a specific order unless expressly stated otherwise.

BRIEF DESCRIPTION OF THE DRAWINGS

FIGS. 6A and 6B illustrate methods performed by a system for improving interplay between digital AT.

DETAILED DESCRIPTION

Figure 1A:
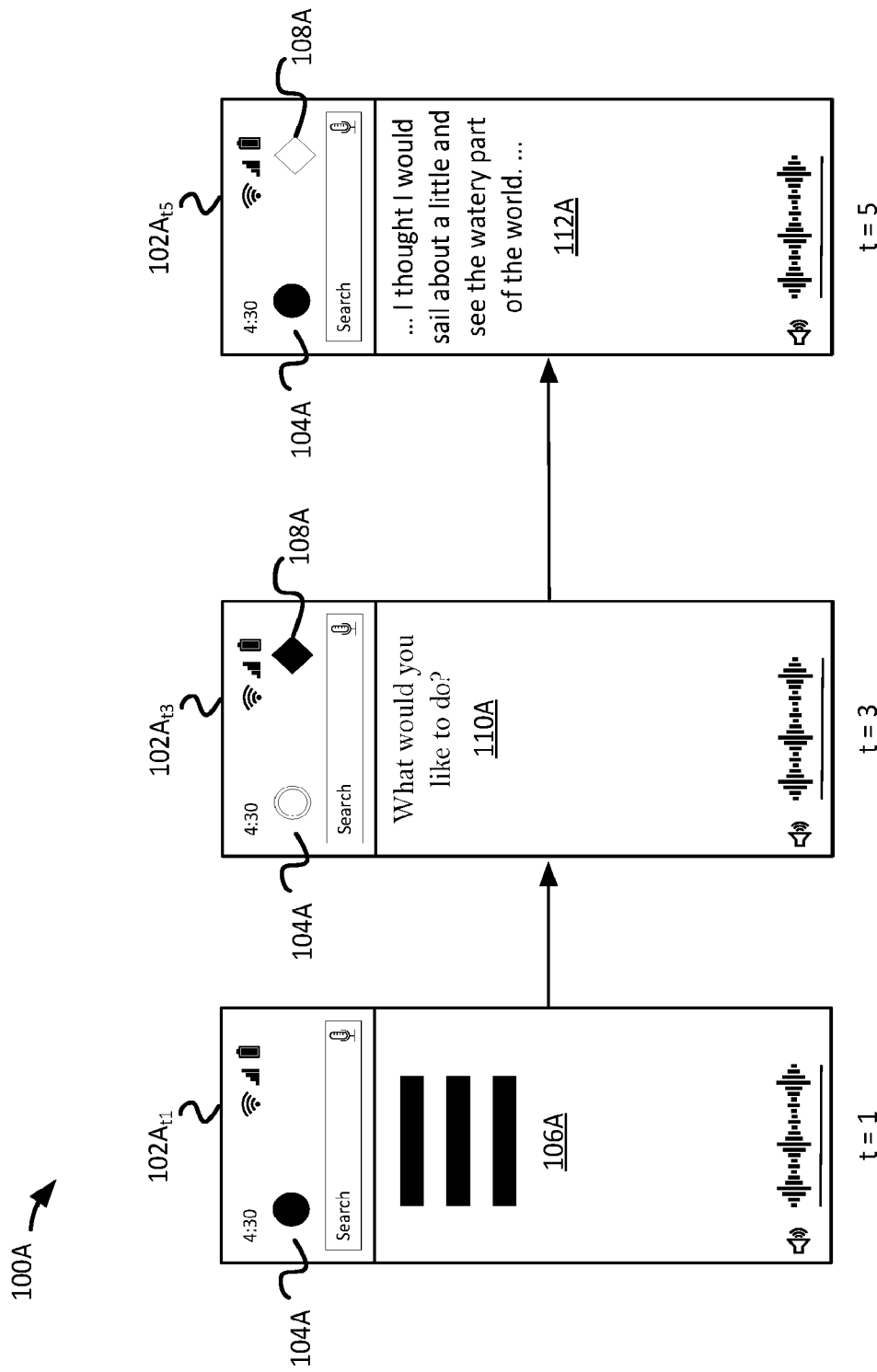
FIG. 1A illustrates a progression of views depicting interplay between multiple digital ATs, according to an example aspect.

Improved interplay between digital assistive technology is described. More specifically, various embodiments of the present technology include systems and methods for inhibiting, adapting, or otherwise manipulating the audio output of a first AT when a second AT is operating at the same, or substantially the same, time. The described systems and methods are particularly suitable for supporting third-party AT functioning as the second AT.

Digital ATs may be designed to enable people experiencing disabilities (e.g., visual impairment, hearing impairment, motor impairment, cognitive impairment, etc.) and literacy challenges, to access and/or interact with computing systems and features of software applications. Digital ATs may include personal assistant software (e.g., Cortana®, Google Assistant®, Seri®, Alexa®), text-to-speech ("TTS") software (e.g., JAWS), and the like. TTS software may use language processing techniques and digital signal processing to convert text, buttons, images, and other user interface elements into speech. TTS software may begin reading aloud displayed user interface elements in response to triggers such as a user input (e.g., mouse click, screen tap, swipe of a finger or digital pen, etc.), transition between applications, webpages, images, pages of digital books, documents, etc., and/or state change of the TTS software to an active state.

Personal assistant software is an alternative technology that uses voice recognition, language processing algorithms, and/or voice synthesis to monitor for voice commands and return relevant information and/or perform functions in accordance with the voice command. For example, a user may audibly request the personal assistant to perform a search, and the personal assistant may respond with the search results.

Personal assistant software can be implemented to provide curated voice assistance ("curated voice assistance software"). Curated voice assistance software may utilize voice recognition, language processing algorithms, and/or voice synthesis to facilitate end-to-end task completion by engaging with a user in a curated conversation that guides the user to content beyond that which may be displayed on the screen of a device. Thus, a curated voice assistant may provide experiences that are curated to facilitate task completion, without requiring the user to look at the screen, and result in more than just a recitation of user interface elements.

The systems, methods, and devices described herein provide an improved means for streamlining interplay between digital assistive tools. For example, existing solutions do not address interferences that occur when two or more digital ATs operate at the same, or substantially the same, time. Advantageously, the technology described herein can provide seamless transitions between multiple digital ATs. More specifically, while multiple digital ATs are operating at substantially the same time, the audio output of a first digital AT may be manipulated and/or controlled by an application and/or second digital AT, wherein the application and second digital AT are distinguished from the first digital AT. A benefit of this novel arrangement includes, but is not limited to, improved audio output (e.g., multiple digital ATs are not reciting content to a user at the same, or substantially the same, time). Another benefit includes, but is also not limited to, prevention of conversation looping between multiple digital ATs. Additional benefits of the technology disclosed herein are also contemplated herein and are not expressly recited only for the sake of brevity.

In an example scenario, a user navigates to a curated voice assistant using a screen reader. When the curated voice assistant recognizes that the screen reader is in use, the curated voice assistant inhibits the audio output of the screen reader. To inhibit the audio output, the curated voice assistant may focus the screen reader on a user interface element that lacks a description, an attribute, an application (e.g., an access rich internet application), a link, a tag, and/or other text; in other words, the user interface element has a null value. The curated voice assistant may also inhibit audio output by providing the screen reader empty strings, blank strings, and/or strings that are null. Alternatively, the curated voice assistant may use an application programming interface ("API") of a device's operating system to inhibit audio output of the screen reader by, for example, pausing and/or ceasing operation of the screen reader, pausing and/or inhibiting the screen reader's access to a speaker system of the device, or otherwise manipulating operation of the screen reader.

The curated voice assistant may then guide a user to complete one or more tasks across one or more platforms and/or applications. Tasks may include, but are not limited to, drafting a communication (e.g., email, instant message, text message, etc.), initiating a communication (e.g., place a telephone call, video call, etc.), drafting a document (e.g., word processing document, spreadsheet, slide presentation, memo, note, etc.), calendaring activities, and the like. The applications may include, but are not limited to, productivity applications (e.g., Microsoft® Office, Microsoft® 365, Google® Workspace, G-Suite®, etc.), calendaring applications, email applications, virtual and augmented reality applications, business applications, gaming applications, and other types of software applications.

The curated voice assistant may restore the audio output of the screen reader after detecting a trigger (e.g., by active input of mouse click, tap on a user input device, swipe with a finger or digital pen, click on a key of a keyboard, etc. or by completion of a task) to transition to a passive state (e.g., all operations are paused, some operations are paused, a monitoring operation begins, a monitoring operation continues while other operations are paused, etc.) or a termination state (e.g., most or all operations are ceased and/or terminated). To restore audio output, the curated voice assistant may release focus of the screen reader from the user interface element that was left null. Alternatively, the curated voice assistant may restore the audio output of the screen reader by halting provision to the accessibility assistant of empty strings, blank strings, and/or strings that are null.

In another embodiment, the curated voice assistant controls (e.g., via an API) the on and off states of a device's microphone. For example, the curated voice assistant may turn off a device's microphone prior to, at substantially the same time of, and/or subsequent to restoring the audio output of the screen reader. Turning off the microphone provides a benefit of precluding the curated voice assistant from interpreting the audio output of the screen reader as an audible input of the user. The curated voice assistant may turn on the microphone when the curated voice assistant is initiated, launched, accessed, functioning, and/or otherwise enters an active state.

Figure 1B:
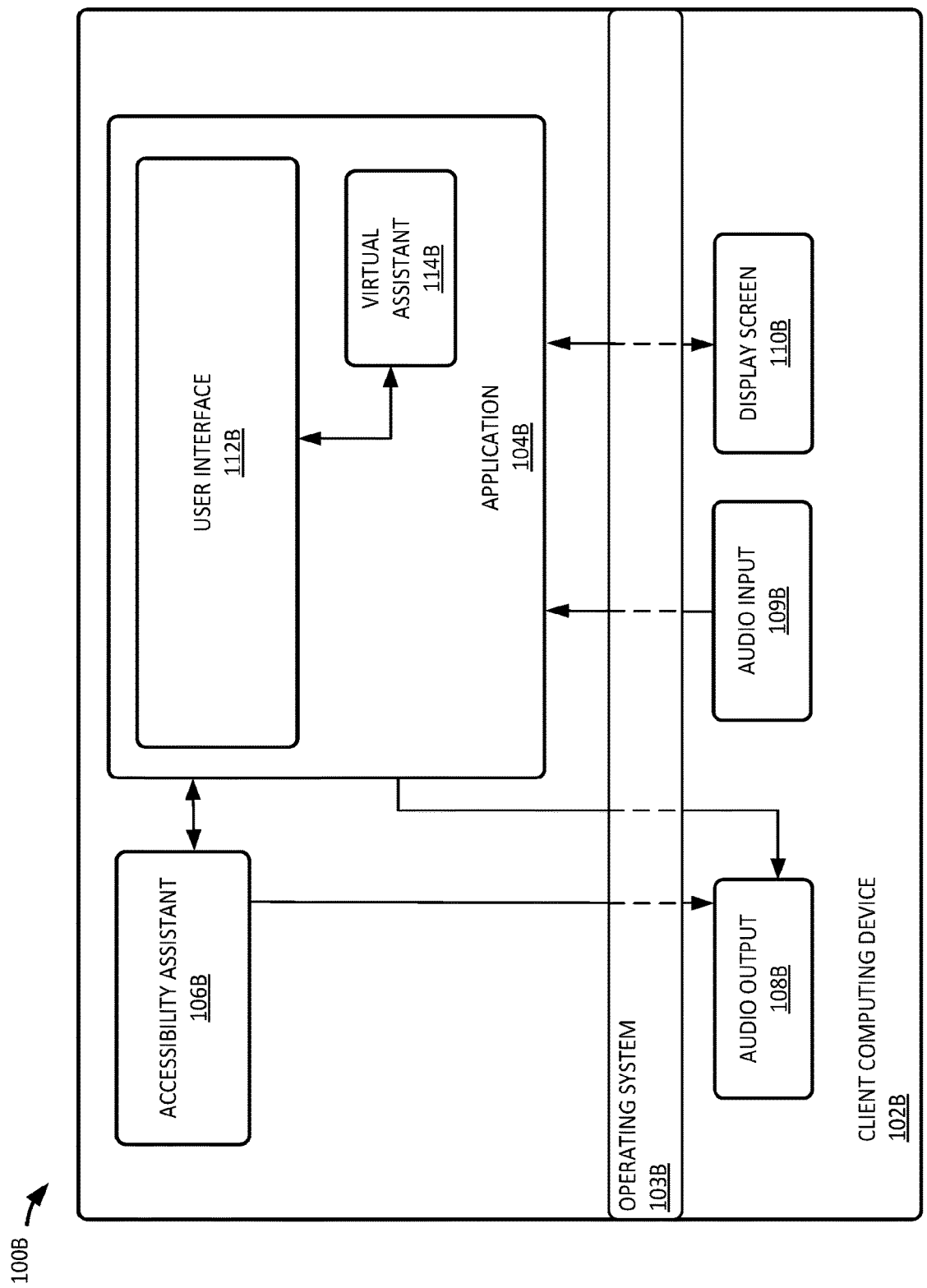
FIG. 1B illustrates a schematic diagram of an example system in which some embodiments of the present technology may be implemented.
Figure 2A:
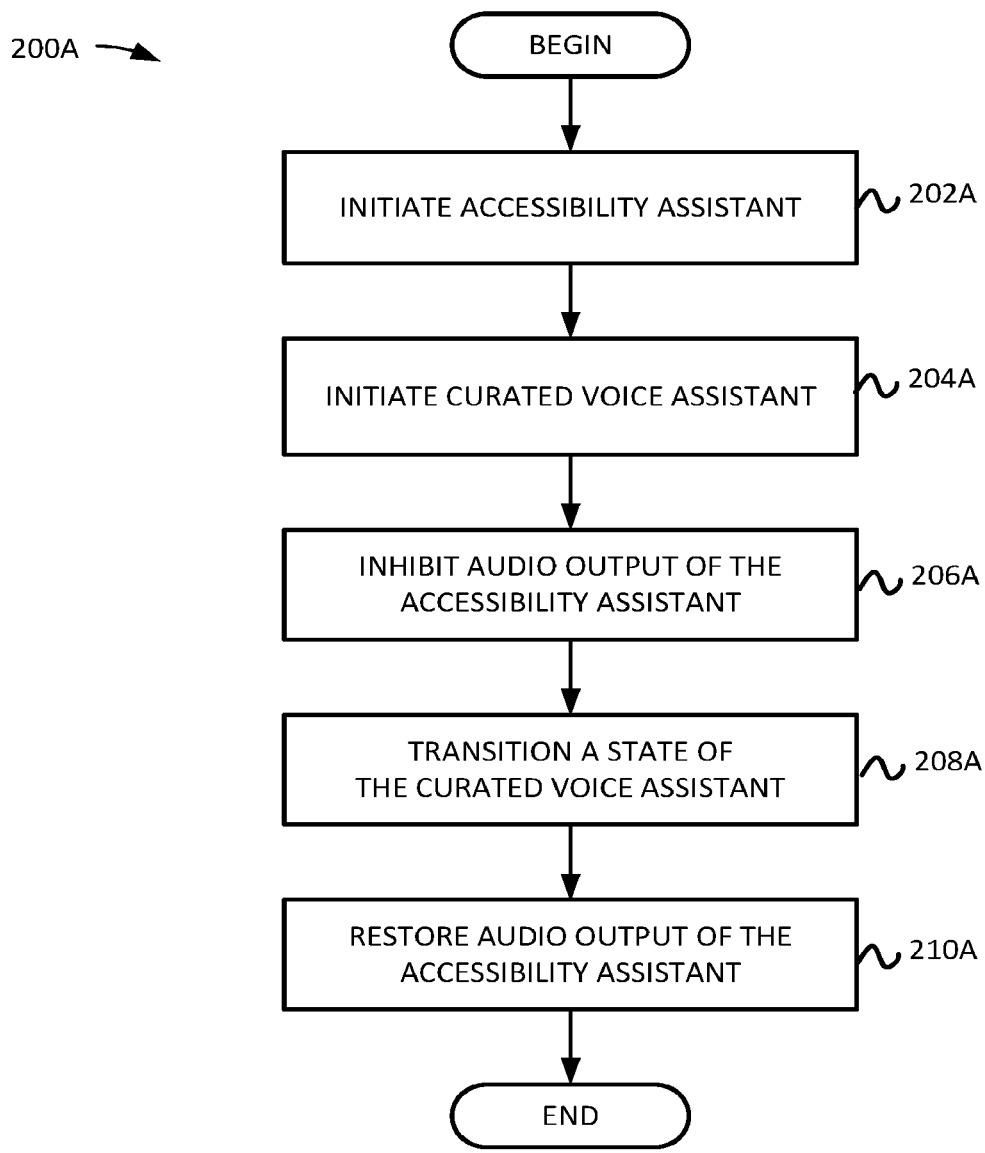
FIG. 2A illustrates an example process flow for improving interplay between multiple digital ATs.
Figure 2B:
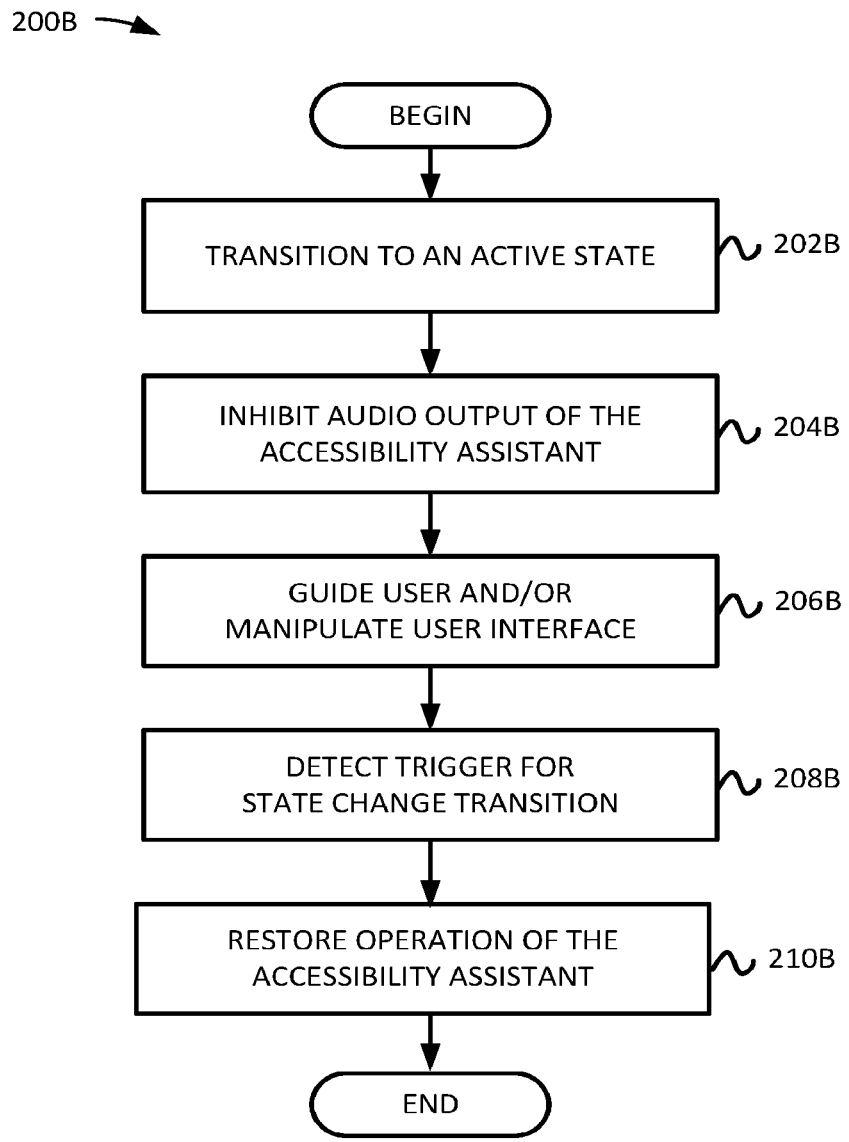
FIG. 2B illustrates an example process flow for improving interplay between digital ATs.

FIG. 1A illustrates a progression of views depicting interplay between multiple digital ATs, according to an example aspect; FIG. 1B illustrates a schematic diagram of an example system in which some embodiments of the present technology may be implemented; FIG. 2A illustrates an example process flow for improving interplay between multiple digital ATs; and FIG. 2B illustrates an example process flow for improving interplay between digital ATs.

Turning now to the drawings, FIG. 1A illustrates example scenario 100A of a progression of views of user interface 102A that depict an interplay between two digital ATs, and FIG. 2A illustrates process flow 200A for improving interplay between multiple digital ATs. Referring parenthetically to the steps of FIG. 2A in the context of FIG. 1A, at time t=1 a first digital AT (i.e., an accessibility assistant) is initiated, functioning, operational, and/or otherwise in an active state (step 202A). User interface $102A_{t1}$ includes icon 104A and menu 106A. Icon 104A is displayed in an active state (i.e., the icon has a solid color), which indicates the audio output of the accessibility assistant is functioning, operational, and/or otherwise active. No other digital ATs are operating at time t=1.

Since its audio output is active, the accessibility assistant may use TTS technology to read aloud the content of menu 106A. A user (not shown) may navigate to a second digital AT (i.e., a curated voice assistant) by clicking, tapping, using the accessibility assistant, or otherwise interacting with an item of menu 106A.

At time t=2, the curated voice assistant transitions to an active state (e.g., is initiated, fully functional, etc.) (step 204A) while the accessibility assistant is operational. In response to detecting the accessibility assistant, the curated voice assistant inhibits the audio output of the accessibility assistant (step 206A).

User interface $102A_{t3}$ includes icon 104A, icon 108A, and message 110A. Icon 104A is displayed in an inactive state (i.e., the icon has a no color), which indicates the audio output of the accessibility assistant is not functioning, not operational, and/or otherwise inactive. Icon 108A is displayed in an active state, which indicates the audio output of the curated voice assistant is functioning, operational, and/or otherwise active.

Since its audio output is active, the curated voice assistant may engage a user (not shown) in a conversation and recite aloud message 110A. The audio output of the curated voice assistant may remain active until a trigger is detected. A trigger may include, but is not limited to, active input of a click of a mouse, tap on a display screen, swipe with a digital pen or finger, click on a key of a keyboard, etc or completion of a task (e.g., a message is sent by an application). In response and/or subsequent to detecting the trigger, the curated voice assistant may transition from an active state to a passive state or a termination state. Additional operational states of digital ATs are also contemplated herein and are not expressly recited only for the sake of brevity.

At time t=3, the accessibility assistant and the curated voice assistant are both operating. However, the curated voice assistant has transitioned from an active state to a passive state (step 208A). Before, during, or after the curated voice assistant entered the passive state, the curated voice assistant restored the audio output of the accessibility assistant to an active state (step 210A).

In user interface $102A_{t5}$, icon 104A is again displayed in an active state thus indicating that the audio output of the accessibility assistant is again functioning, operational, and/or otherwise active. Icon 108A is now displayed in an inactive state, which indicates the audio output of the curated voice assistant is no longer functioning, not operational, and/or otherwise inactive.

Since its audio output is active, the accessibility assistant may recite aloud the content of canvas 112A.

Figure 7:
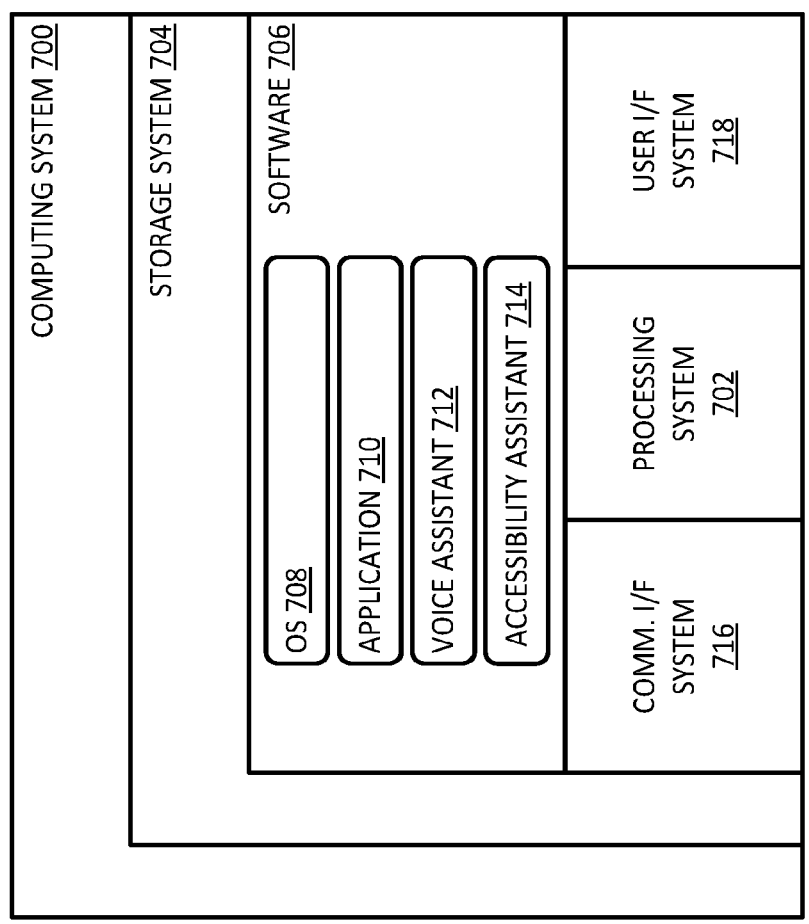
FIG. 7 illustrates components of a computing system that may be used to implement certain methods described herein.

FIG. 1B illustrates a schematic diagram of system 100B, which can implement client computing device 102B. Client computing device 102B includes operating system 103B, application 104B, accessibility assistant 106B, audio output device 108B, audio input device 109B, and display screen 110B. Client computing device 102B is representative of any physical or virtual computing resource, or combination thereof, suitable for executing operating system 101B, application 104B, and accessibility assistant 106B and operating audio output device 108B, audio input device 109B, and display screen 110B, of which computing device 700 of FIG. 7 is representative. Examples of client computing device 102B include, but are not limited to, personal computers, laptop computers, tablet computers, mobile phones, wearable devices, external displays, virtual machines, and containers, as well as any variation, combination, or collection thereof. Client computing device 102B may communicate with a one or more servers (not show) that may host one or more application services (not shown) and/or data repositories (not shown), via one or more network connections (not shown).

Operating system 103B is implemented in software and, when executed by client computing device 102B, manages computer hardware (e.g., audio output device 108B, audio input device 109B, and display screen 110B), software resources (e.g., for application 104B and accessibility assistant 106B), and provides common services for computer programs. OS 708 of FIG. 7 is representative of operating system 103B.

Application 104B is implemented in software and, when executed by client computing device 102B, renders user interface 112B. Some commercial examples of application 104B include, but are not limited to, Microsoft® Office, Microsoft® 365, Google® Workspace, G-Suite®, etc. Application 104B may be a locally installed and executed application, a desktop application, a mobile application, a streamed (or streaming) application, a web-based application that is executed in the context of a web-browser, and the like. Application 710 of FIG. 7 is representative of Application 104B.

Virtual assistant 114B is representative of a digital AT implemented in program instructions that include various software modules, components, and other elements of an application. Example process flows 200A of FIG. 2A, 200B of FIG. 2B, 600A of FIG. 6A, and 600B of FIG. 6B are representative of some of the functionality that may be provided by one or more of the software elements of virtual assistant 114B. Virtual assistant 114B may be implemented as a stand-alone software application, as a feature of application 104B, and/or as a feature of a third-party application (not shown). Virtual assistant 114B may be a curated voice assistant. Voice assistant 712 of FIG. 7 is representative of virtual assistant 114B. Client computing device 102B may further include a built-in virtual assistant (not shown) that interfaces with the operating system 103B.

Accessibility assistant 106B is representative of a digital AT implemented in program instructions that include various software modules, components, and other elements of an application. Some commercial examples of accessibility assistant 106B include Job Access With Speech ("JAWS"), Cortana®, Google Assistant®, Seri®, and Alexa®. Accessibility assistant 106B may be implemented as a stand-alone software application, as a feature of operating system 103B, and/or as a feature of a third-party application (not shown). Accessibility assistant 714 of FIG. 7 is representative of accessibility assistant 106B.

FIG. 2B illustrates process flow 200B for improving interplay between multiple digital ATs. Referring parenthetically to the steps of FIG. 2B in the context of FIG. 1B, virtual assistant 114B may transition into an active state (e.g., be initiated, launched, accessed, fully functional, etc.) (step 202B). Virtual assistant 114B may enter an active state in response and/or subsequent to detecting a trigger (e.g., selection of an element of user interface 112B, etc.).

In response and/or subsequent to detecting, or otherwise determining, that accessibility assistant 106B is operational, virtual assistant 114B may inhibit an ability of accessibility assistant 106B to read out an audible description of user interface 112B (step 204B). Inhibiting the ability of accessibility assistant 106B to read out the audible description may include providing accessibility assistant 106B empty strings (e.g., in user interface 112B), focusing and/or changing a focus of accessibility assistant 106B to a portion of the user interface that lacks content for accessibility assistant 106B to consume (e.g., a portion of the user interface having a null value, etc.), and/or controlling an operation of accessibility assistant 106B using an API of client computing device 102B (e.g., the API of operating system 103B).

Virtual assistant 114B may commence and/or conduct an audible conversation (e.g., a curated conversation, a bi-directional conversation, etc.) between a user and virtual assistant 114B (e.g., to guide the user through one or more tasks across one or more applications) (step 206B). The audible conversation may occur through one or more user interface systems (e.g., audio output device 108B, audio input device 109B, and display screen 110B), of which user interface system 718 of FIG. 7 is representative. Alternatively, virtual assistant 114B may edit, change, interact with, and/or otherwise manipulate user interface 112B (e.g., in response to verbal input or command).

Subsequent and/or in response to detecting a to transition from the active state to a different state (e.g., passive state, termination state, etc.) (step 208B), virtual assistant 114B may restore the ability of accessibility assistant 106B to read out the audible description of user interface 112B (step 210B).

Figure 3A:
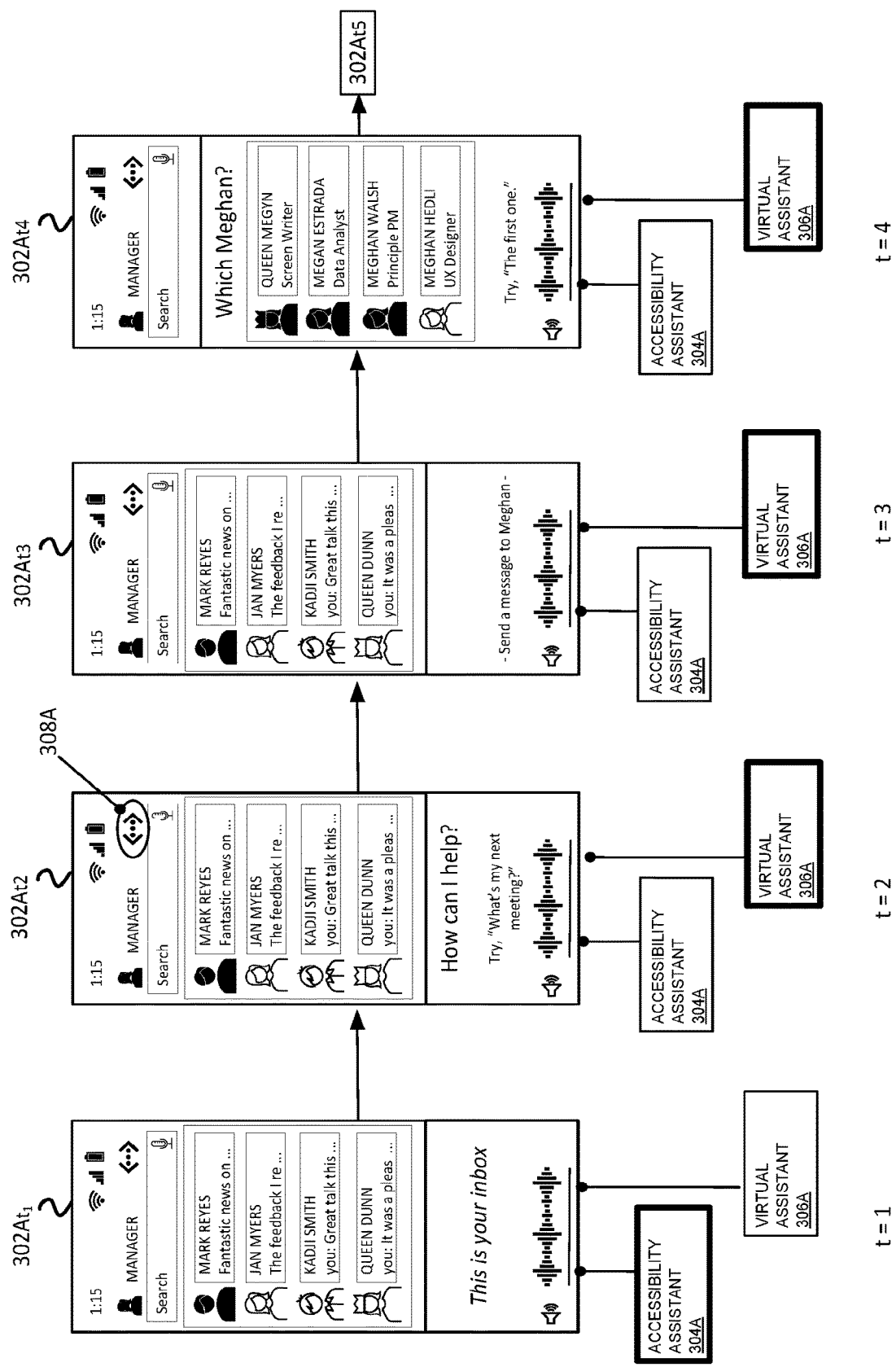
FIGS. 3A and 3B illustrate a progression of views of user interfaces according to example aspects.
Figure 3B:
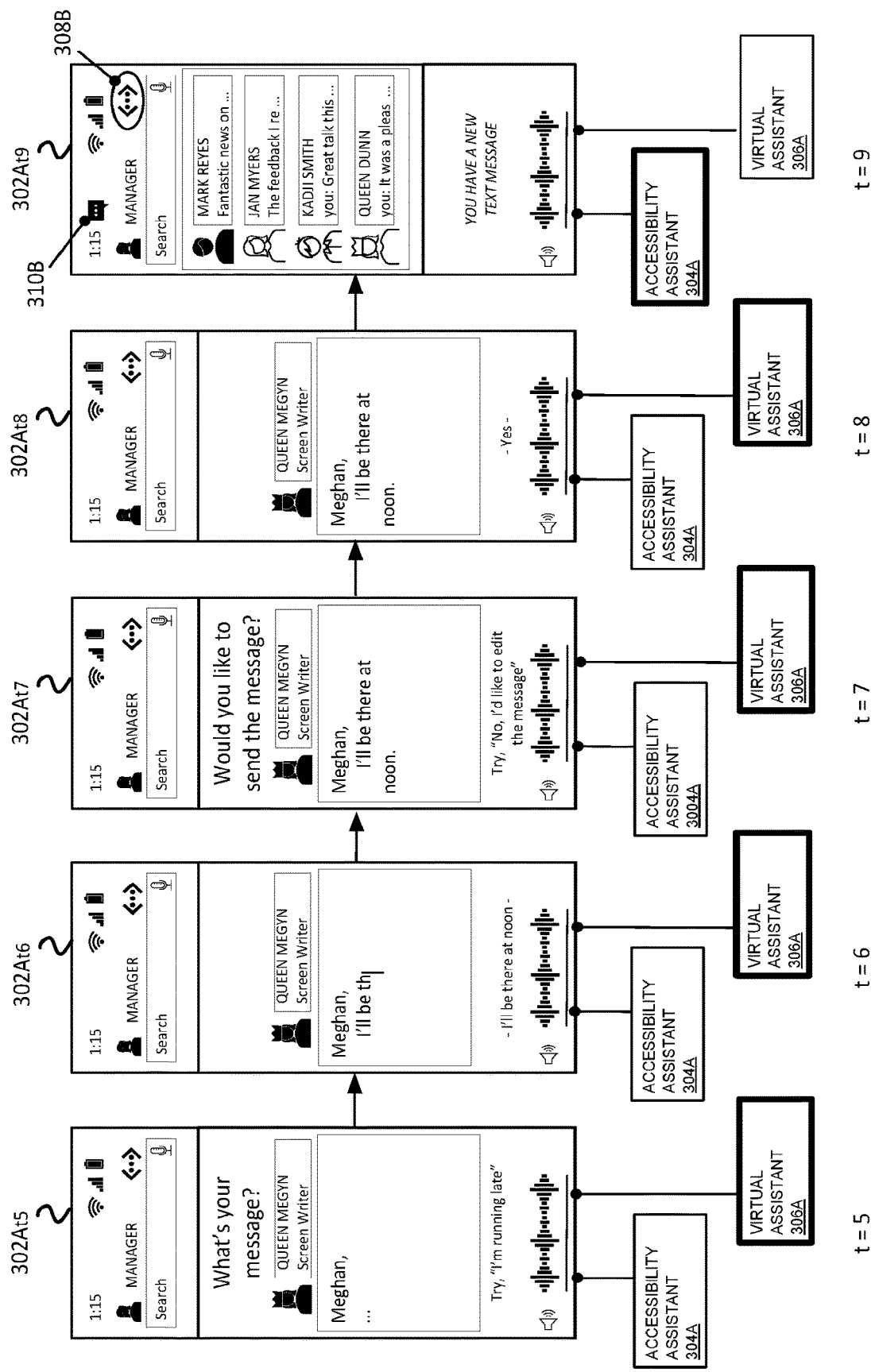

FIGS. 3A and 3B illustrate a progression of views of user interfaces according to example aspects. Here, a progression of views of user interface 302 are shown that depict an interplay between two digital ATs: accessibility assistant 304A (which may be implemented as described with respect to accessibility assistant 106B) and virtual assistant 306A (which may be implemented as described with respect to virtual assistant 114B). Starting with FIG. 3A, at time t=1 accessibility assistant 304A and virtual assistant 306A are both operational. Initially, accessibility assistant 304A has a bold outline, which indicates that accessibility assistant 304A is in an active state. While in the active state, accessibility assistant 304A has the ability to read out audible descriptions of user interface $302A_{t=1}$ (e.g., "This is your inbox."). Virtual assistant 306A does not have a bold outline, which indicates that virtual assistant 306A is not in an active state.

At time t=2, trigger 308A is made via user interface $302A_{t=1}$. Trigger 308A may include, but is not limited to, a mouse click, a touch gesture, a swipe gesture made with a digital pen or a finger, a click on a key of a keyboard, a voice input, a motion input, and any other user input suitable for interacting with user interface $302A_{t=1}$. In response and/or subsequent to detecting trigger 308A, accessibility assistant 304A transitions from an active state (e.g., into a passive state), which is demonstrated by the replacement of the bold line around accessibility assistant 304A with a narrow line. Additionally, virtual assistant 306A transitions into an active state, which is depicted by the bold line around virtual assistant 306A. While in the active state, virtual assistant 306A inhibits the ability of accessibility assistant 304A to read out audible descriptions of user interface $302A_{t=2}$.

Also, at time t=2 virtual assistant 306A commences a bi-directional and curated conversation with a user (not shown). For example, virtual assistant 306A may ask aloud and/or as displayed text in user interface $302A_{t=2}$, an initial question (e.g., "How can I help?"). An initial question (i.e., the first question virtual assistant 306A presents to a user) may be used to identify a task and/or an order of steps to complete a task. Similarly, follow-on questions (i.e., questions virtual assistant 306A presents to a user subsequent to the initial question) may be used to guide a user through an order of next steps for completing an identified task). Alternatively, clarifying questions (i.e., questions virtual assistant 306A presents to a user subsequent to the initial question and/or a follow-on question) may be used to facilitate completion of a single step in an order of steps that lead to completion of the identified task.

Virtual assistant 306A may provide the user with a suggested response to the initial question (e.g., "Try, 'What's my next meeting?'"). Initial questions, follow-on questions, clarifying questions, and/or suggested responses may be derived, selected, generated, and/or otherwise curated from a single source or synthesized from a combination of sources (e.g., a server that hosts one or more applications, an application stored locally on a client computing device, a data repository hosted by a server, data repository stored locally on a client computing device, etc.).

At time t=3, virtual assistant 306A remains in an active state and accessibility assistant 304A remains in an inactive state. The user responds to virtual assistant 306A's initial question with a verbal request to initiate a task (e.g., user interface $302A_{t=3}$ illustrates the user commanding virtual assistant 306A to "send a message to Meghan"). In response and/or subsequent to initiating the task, virtual assistant 306A may guide the user to one or more platforms and/or applications that may facilitate completion of the initiated task. The one or more platforms and/or applications may include the application the user used to initiate virtual assistant 306A. Alternatively, the one or more platforms and/or applications may be distinguished from the application the user used to initiate virtual assistant 306A.

At time t=4, virtual assistant 306A remains in an active state and accessibility assistant 304A remains in an inactive state. In response and/or subsequent to initiating the task, virtual assistant 306A may access a database (not shown), server (not shown), application (not shown), or other resource (not shown) to further curate the conversation. For example, virtual assistant 306A may access a contact list of an email application, instant messenger service, dialer service, etc. to generate a list of potential contacts that fit the description provided by the user (e.g., Meghan Hedli, Queen Megyn, Megan Estrada, Meghan Walsh, etc.), Virtual assistant 306A may then cause the list of potential contacts to be displayed in user interface $302A_{t=4}$.

Virtual assistant 306A may continue the bi-directional, curated conversation by asking aloud a clarifying question (e.g., "Which Megan?"). Virtual assistant 306A may also provide the user with a suggested response (e.g., "Try, 'The first one.'").

Turning to FIG. 3B, at time t=5 virtual assistant 306A remains in an active state and accessibility assistant 304A remains in an inactive state. The user (not shown) indicates that the message should be sent to the contact listed first (i.e., Queen Megyn), as suggested by virtual assistant 306A. In response to the user's verbal input, virtual assistant 306A calls forth a canvas in which to draft the message to Meghan. Virtual assistant 306A may then curate the draft of the message prior to the user indicating specific text to include in the message. For example, user interface $302A_{t=5}$ displays the draft message, which is addressed to "Meghan." In the instant example, virtual assistant 306A curated the draft message at least by using natural language processing to analyze the verbal command to "send a message to Meghan" and synthesizing a portion of the verbal command (e.g., the term "Meghan") with a portion of the contact information (e.g., Queen Meghan's email address) selected by virtual assistant 306A from a contact list of the user.

Virtual assistant 306A may continue the bi-directional, curated conversation by asking a follow-on question verbally and/or textually (e.g., "What's your message?"). Virtual assistant 306A may also provide the user with another suggested response (e.g., "I'm running late'").

At time t=6, virtual assistant 306A remains in an active state and accessibility assistant 304A remains in an inactive state. The user may continue the bi-directional, curated conversation by verbally commanding virtual assistant 306A to incorporate specific text in the message (e.g., "I'll be there at noon"). In response and/or subsequent to the verbal command, virtual assistant 306A begins editing the draft message in accordance with the verbal command. The edits may be displayed in user interface 302A$_{t=6}$ as a completed step or in real-time as virtual assistant 306A is completing the step.

At time t=7, virtual assistant 306A remains in an active state and accessibility assistant 304A remains in an inactive state. After incorporating the specific text and causing an updated canvas to be displayed in user interface 302A$_{t=7}$, virtual assistant 306A may continue the by bi-directional, curated conversation by asking aloud a follow-on question (e.g., "Would you like to send the message?"). Virtual assistant 306A may also provide a suggested response (e.g., "Try, 'No, I'd like to edit the message'").

At time t=8, virtual assistant 306A remains in an active state and accessibility assistant 304A remains in an inactive state. The user may respond to the follow-on question with a command that complete the task (e.g., "yes," send the message).

At time t=9, trigger 308B is made via user interface 302A$_{t=9}$. Trigger 308B may include, but is not limited to, a mouse click, a touch gesture, a swipe gesture made with a digital pen or a finger, a click on a key of a keyboard, a voice input, a motion input, and any other user input suitable for interacting with user interface 302A$_{t=9}$. Of course, in some cases, the trigger is not an action by the user but instead is completion of the task (e.g., sending the message). In response and/or subsequent to detecting trigger 308B, accessibility assistant 304A transitions back into an active state, which is demonstrated by the replacement of the narrow line around accessibility assistant 304A with a bold line. Additionally, virtual assistant 306A transitions from an active state (e.g., into a passive state), which is depicted by the narrow line around virtual assistant 306A. Before, during, or after transitioning from an active state, virtual assistant 306A restores the ability of accessibility assistant 304A to read out audible descriptions of user interface 302A$_{t=9}$. For example, accessibility assistant 304A may focus on text message indicator 310B and recite aloud, "You have a new text message").

Figure 4:
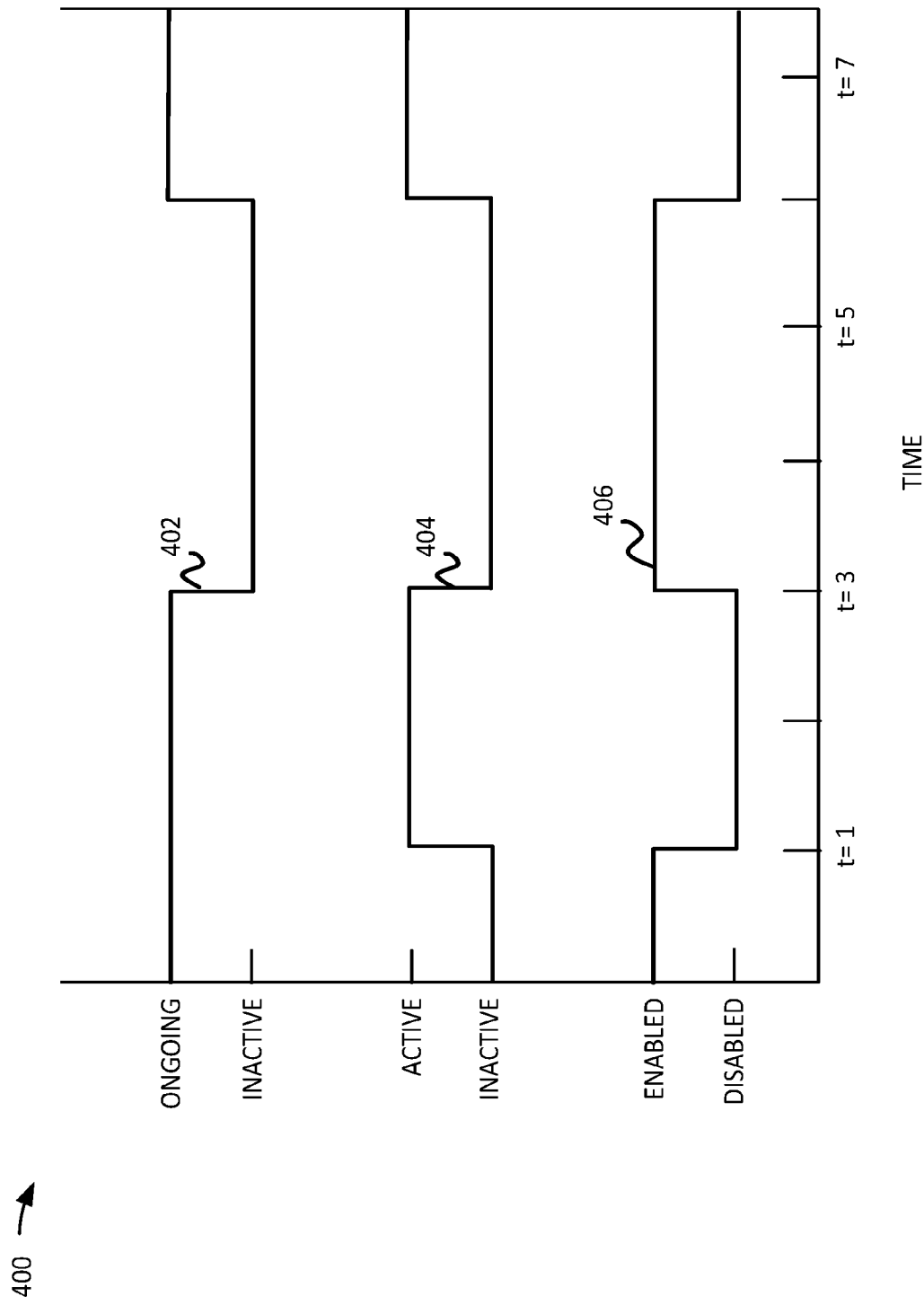
FIG. 4 illustrates a conceptual schematic of state change transitions overtime, according to an example aspect.

FIG. 4 illustrates a conceptual schematic of state change transitions overtime, according to an example aspect. That is, FIG. 4 illustrates a conceptual schematic 400 of various state transitions over time as depicted by state transition curves 402, 404, and 406. Specifically, state transition curve 402 represents transitions that occurred when a conversation between a user and a digital AT (i.e., a virtual assistant) entered an "ongoing state" and when the conversation entered a "paused or terminated state." State transition curve 404 represents transitions that occurred when the virtual assistant entered an "active" state and when it entered an "inactive state." Similarly, state transition curve 406 represents transitions that occurred when an ability of an accessibility assistant to recite aloud an element of a user interface entered an "enabled" state and when the ability of the accessibility assistant to recite aloud the element of the user interface entered a "disabled" state.

At time t=0, state transition curve 402 indicates that the conversation between the user and the virtual assistant is ongoing, state transition curve 404 indicates that virtual assistant is in an inactive state (i.e., a passive state or a terminated state), and state transition curve 406 indicates that the ability of an accessibility assistant to recite aloud an element of a user interface is in an enabled state (i.e., the accessibility assistant may recite aloud elements of a user interface).

At time t=1, state transition curve 402 indicates that the "ongoing" state of the conversation is maintained, state transition curve 404 indicates that the state of the virtual is transitioning from "inactive" to "active," and state transition curve 406 indicates that the ability of the accessibility assistant to recite aloud an element of a user interface is transitioning from an "enabled" state to a "disabled" state (i.e., the accessibility assistant is inhibited from reciting aloud elements of a user interface).

At time t=2, state transition curve 402 indicates that the "ongoing" state of the conversation is maintained, state transition curve 404 indicates that the "active" state of the virtual is maintained, and state transition curve 406 indicates that the ability of the accessibility assistant to recite aloud an element of a user interface continues to be in a "disabled" state.

At time t=3, state transition curve 402 indicates that the "ongoing" state of the conversation is transitioning to an "inactive" state (i.e., a passive state or a terminated state), state transition curve 404 indicates that the state of the virtual is transitioning from "active" to "inactive," and state transition curve 406 indicates that the ability of the accessibility assistant to recite aloud an element of a user interface is transitioning from a "disabled" state to an "enabled" state.

At times t=4 and 5, state transition curve 402 indicates that the "inactive" state of the conversation is maintained, state transition curve 404 indicates that the "inactive" state of the virtual is maintained, and state transition curve 406 indicates that the ability of the accessibility assistant to recite aloud an element of a user interface continues to be in a "enabled" state.

At time t=6, state transition curve 402 indicates that the "inactive" state of the conversation is transitioning to an "active" state, state transition curve 404 indicates that the state of the virtual is transitioning from "inactive" to "active," and state transition curve 406 indicates that the ability of the accessibility assistant to recite aloud an element of a user interface is transitioning from a "enabled" state to an "disabled" state.

At time t=7, state transition curve 402 indicates that the "ongoing" state of the conversation is maintained, state transition curve 404 indicates that the "active" state of the virtual is maintained, and state transition curve 406 indicates that the ability of the accessibility assistant to recite aloud an element of a user interface continues to be in a "disabled" state.

Figure 5:
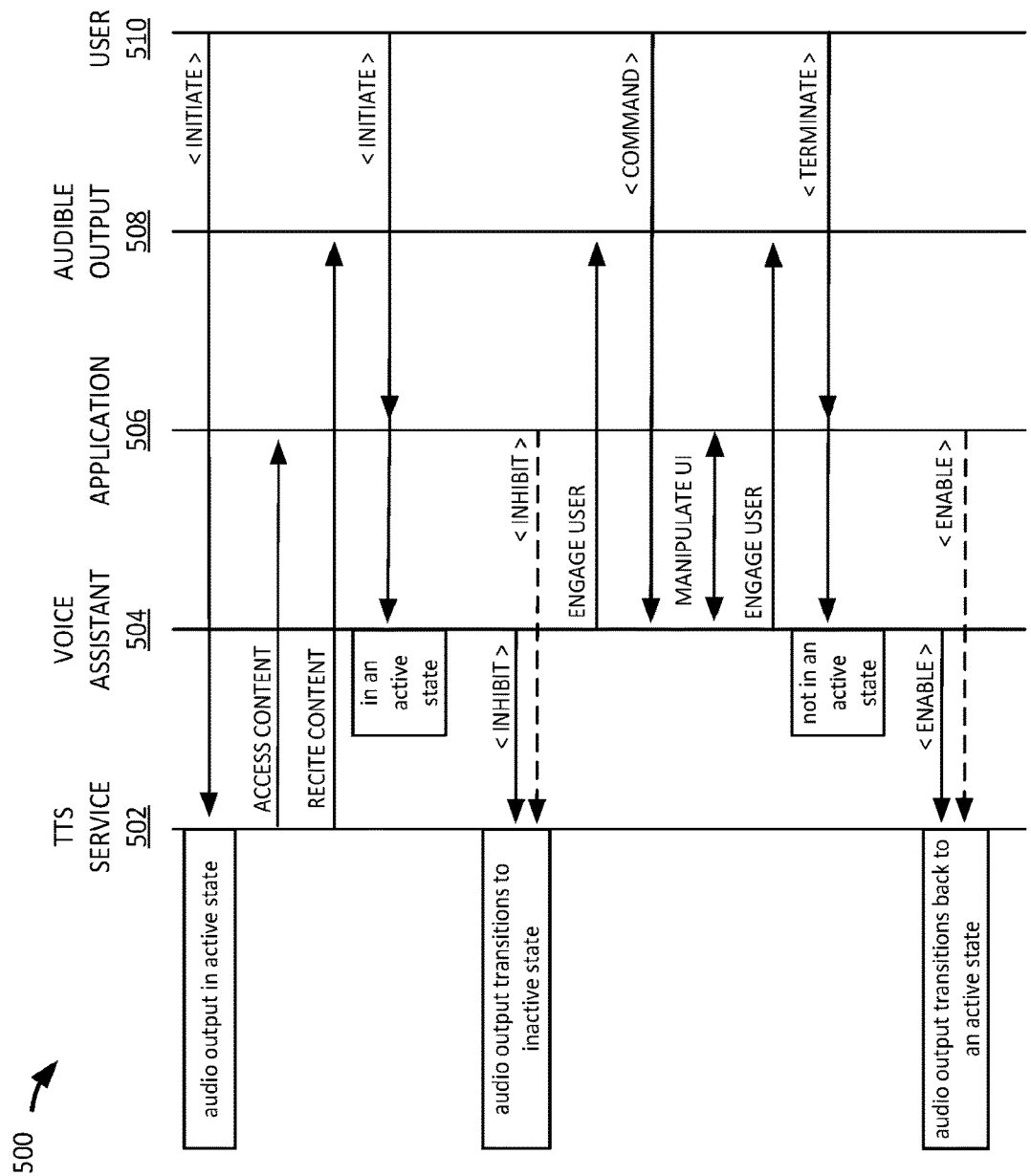
FIG. 5 illustrates a conceptual schematic according to an example aspect.
Figure 6A:
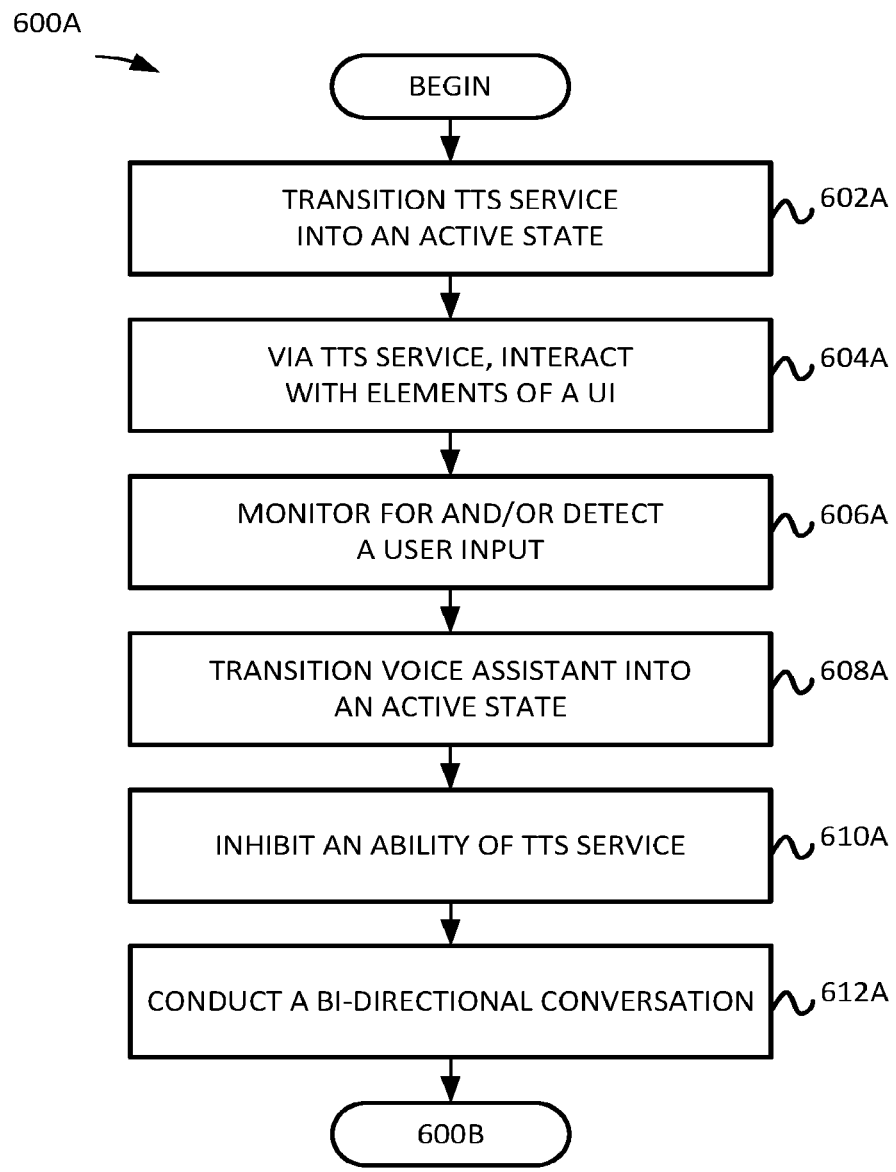
Figure 6B:
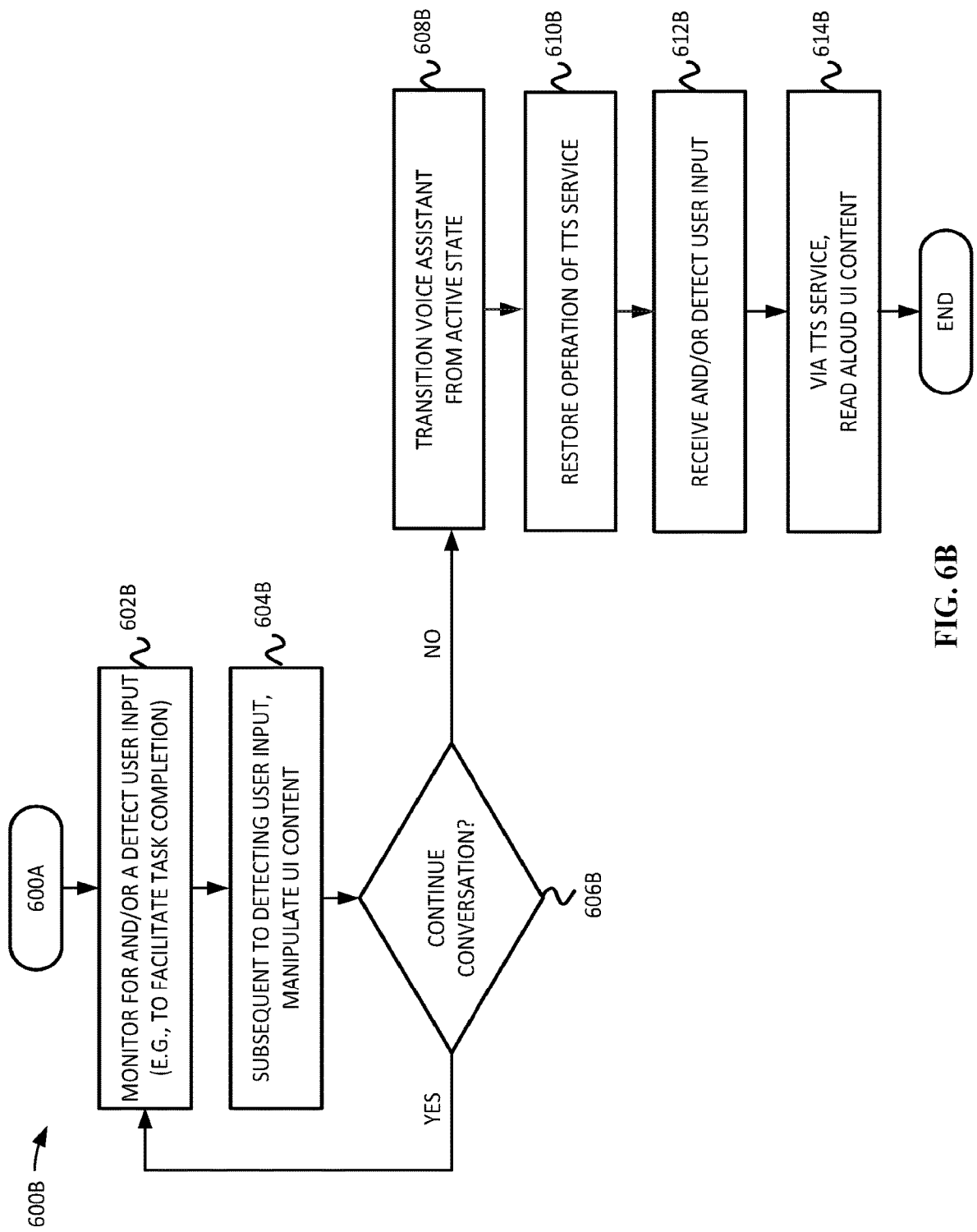

FIG. 5 illustrates a conceptual schematic according to an example aspect; and FIGS. 6A and 6B illustrate methods performed by a system for improving interplay between digital AT. That is, FIG. 5 illustrates a conceptual schematic 500 of interactions between TTS service 502 (which may be implemented as described with respect to accessibility assistant 106B), voice assistant 504 (which may be implemented as described with respect to virtual assistant 114B), application 506 (which may be implemented as described with respect to application 104B), audio output 508, and user 510; and FIGS. 6A and 6B illustrate process flows 600A and 600B for improving interplay between multiple digital ATs. Referring parenthetically to the steps of FIGS. 6A and 6B in the context of FIG. 5, an initial user input from user 510 is detected. In response to the initial user input, TTS service 520 initiates, launches, becomes fully operational, and/or otherwise transitions to an active state (step 602A).

While in the active state, TTS service 502's audio output state (e.g., the ability to recite aloud elements of a user interface) is also active. While its audible output state is active, TTS service 502 can access the content of application 506 and recite aloud (e.g., using TTS technology) a description of content in a user interface of application 506 (step 604A).

In response to monitoring for and subsequently detecting (e.g., via voice assistant 504 and/or application 506) a subsequent user input from user 510 (step 606A), voice assistant 504 initiates, launches, becomes fully operational, and/or otherwise transitions to an active state (step 608A). While in an active state, voice assistant 504 and/or application 506 may inhibit an ability of TTS service 520 to recite aloud descriptions of content in the user interface of application 506 (step 610A).

While in an active state, voice assistant 504 and/or application 506 may commence and/or conduct an audible conversation (e.g., a curated conversation, a bi-directional conversation, etc.) between user 510, voice assistant 504, and/or application 506 (step 612A). While engaging in the bi-directional and/or curated conversation with user 510, voice assistant 504 and/or application 506 may monitor for and/or detect subsequent inputs from user 510 (step 602B). The subsequent inputs may be analyzed and parsed by voice assistant 504 and/or application 506 to identify, synthesize, produce, and/or otherwise generate content using one or more applications. Voice assistant 504 and/or application 506 may incorporate the generated content into a user interface of application 506 and/or otherwise manipulate elements of the user interface (e.g., to facilitate completion of a task) (step 604B).

The bi-directional and/or curated conversation may continue until a user input to pause, terminate, or otherwise place voice assistant 504 in an inactive state is received and/or detected (step 606B). In response to the user input, voice assistant 504 may be transitioned from the active state (e.g., into an inactive state) (step 608B).

Before, during, or after transitioning to an inactive state, voice assistant 504 may restore the ability of TTS service 520 to recite aloud descriptions of content in the user interface of application 506 (step 610B).

Further input from user 510 may be received and/or detected (step 612B). In response to further input, TTS service 520 may commence reading audible descriptions of elements, features, and content of a user interface to application 506 (step 614B).

FIG. 7 illustrates components of a computing system that may be used to implement certain methods described herein. FIG. 7 illustrates computing system 700 that is representative of any system or collection of systems in which the various applications, services, scenarios, and processes disclosed herein may be implemented. Examples of computing system 700 include, but are not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Other examples may include server computers, rack servers, web servers, cloud computing platforms, and data center equipment, as well as any other type of physical or virtual server machine, container, and any variation or combination thereof.

Computing system 700 may be implemented as a single apparatus, system, or device or may be implemented in a distributed manner as multiple apparatuses, systems, or devices. Computing system 700 includes, but is not limited to, processing system 702, storage system 704, software 706, communication interface system 716, and user interface system 718. Processing system 702 is operatively coupled with storage system 704, communication interface system 716, and user interface system 718.

Processing system 702 loads and executes software 706 from storage system 704. Software 706 includes OS 708, application 710, voice assistant 712, and accessibility assistant 714. When executed by processing system 702 to improve interplay between digital ATs as discussed with respect to the preceding FIGS. 1A-6B, software 706 directs processing system 702 to operate as described herein for at least the various processes, operational scenarios, and sequences discussed in the foregoing implementations. Computing system 700 may optionally include additional devices, features, or functionality not discussed for purposes of brevity.

Referring still to FIG. 7, The processing system 702 may be, or is included in, a system-on-chip (SoC) along with one or more other components such as network connectivity components, sensors, video display components. Examples of processors of the processing system 702 include general purpose central processing units, application specific processors, and logic devices, as well as any other type of processing device, combinations, or variations thereof. In some cases, processing system 702 includes a micro-processor and other circuitry that retrieves and executes software 706 from storage system 704. Processing system 702 may be implemented within a single processing device, but may also be distributed across multiple processing devices or sub-systems that cooperate in executing program instructions.

Storage system 704 may include any computer readable storage media readable by processing system 702 and capable of storing software 706. Storage system 704 may include volatile and nonvolatile, removable and non-removable media implemented in any method or technology for storage of information, such as computer readable instructions, data structures, program modules, or other data. Examples of storage media include random access memory, read only memory, magnetic disks, optical disks, CDs, DVDs, flash memory, virtual memory and non-virtual memory, magnetic cassettes, magnetic tape, magnetic disk storage or other magnetic storage devices, or any other suitable storage media. In no case is the computer readable storage media a propagated signal.

Storage system 704 may be implemented as a single storage device, but may also be implemented across multiple storage devices or sub-systems co-located or distributed relative to each other. Storage system 704 may include additional elements, such as a controller, capable of communicating with processing system 702 or possibly other systems.

Software 706 may be implemented in program instructions and among other functions may, when executed by processing system 702, direct processing system 702 to operate as described with respect to the various operational scenarios, sequences, and processes illustrated herein. For example, software 706 can include operating system 708, application 710, voice assistant 712, accessibility assistant 714, and the like.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 706 may include additional processes, programs, or components, such as operating system software, virtual machine software, or other application software, in addition to or that include integrated system 706. Software 706 may also include firmware or some other form of machine-readable processing instructions executable by processing system 702.

In general, software 706 may, when loaded into processing system 702 and executed, transform a suitable apparatus, system, or device (of which computing system 700 is representative) overall from a general-purpose computing system into a special-purpose computing system customized to facilitate enhanced content detection and correction systems. Indeed, encoding software 706 on storage system 704 may transform the physical structure of storage system 704. The specific transformation of the physical structure may depend on various factors in different implementations of this description. Examples of such factors may include, but are not limited to, the technology used to implement the storage media of storage system 704 and whether the computer-storage media are characterized as primary or secondary storage, as well as other factors.

Communication interface system 716 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 718 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 718. In some cases, the input and output devices may be combined in a single device, such as a display capable of displaying images and receiving touch gestures. The aforementioned user input and output devices are well known in the art and need not be discussed at length here.

User interface system 718 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface.

Communication between computing system 700 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents an example method of operating a computing device in support of improved accessibility, the method including: displaying a user interface to an application on a display screen of the computing device, wherein the computing device includes an accessibility assistant that reads an audible description of an element of the user interface; initiating, on the computing device, a virtual assistant that conducts an audible conversation between a user and the virtual assistant through at least a microphone and a speaker associated with the computing device, wherein the virtual assistant is not integrated with an operating system of the computing device; inhibiting an ability of the accessibility assistant to read the audible description of the element of the user interface; and upon transition of the virtual assistant from an active state, enabling the ability of the accessibility assistant. In further examples, wherein inhibiting the ability of the accessibility assistant to read the audible description of the element of the user interface includes controlling an operation of the accessibility assistant by the virtual assistant using an application programming interface of the computing device. In other examples, inhibiting the ability of the accessibility assistant includes providing empty strings to the accessibility assistant. In further examples, the accessibility assistant includes a screen reader (TTS) assistant that reads out descriptions of user interfaces to allow users to navigate the user interfaces by user inputs on display screens. In other examples, the curated voice assistant includes a curated voice assistant capable of engaging in bi-directional voice conversations with users. In other examples, the application includes the virtual assistant and/or operating system of the computing device includes the accessibility assistant. In another example, the method further includes focusing the accessibility assistant on a portion of the user interface having a null value.

Further aspects disclosed herein provide example computing devices including: a processing system; one or more storage media; instructions stored on at least one of the one or more storage media, the instructions directing the processing system to at least: display a user interface to an application on a display screen of the computing device, wherein the computing device includes an accessibility assistant that reads an audible description of a feature of the user interface; initiate, on the computing device, a virtual assistant that conducts an audible conversation between a user and the virtual assistant through at least a microphone and a speaker associated with the computing device, wherein the virtual assistant is not integrated with an operating system of the computing device; inhibit an ability of the accessibility assistant to read the audible description of the feature of the user interface; and upon transition of the virtual assistant from an active state, enable the ability of the accessibility assistant to operate.

Additional aspects disclosed herein provide example systems including: one or more computer-readable storage media having instructions stored thereon that, when executed by a processing system, direct the processing system to: display a user interface to an application on a display screen of a computing device, wherein the computing device includes an accessibility assistant that reads out an audible description of the user interface; initiate, on the computing device, a virtual assistant that conducts an audible conversation between a user and the virtual assistant through at least a microphone and a speaker associated with the computing device, wherein the virtual assistant is not integrated with an operating system of the computing device; inhibit an audio output of the accessibility assistant; and upon transition of the virtual assistant from an active state, enable the audio output of accessibility assistant.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Embodiments may be implemented as a computer process (method), a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process. It should be understood that as used herein, in no case do the terms "storage media", "computer-readable storage media" or "computer-readable storage medium" consist of transitory, propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

What is claimed is:

1. A method of operating a computing device in support of improved accessibility, the method comprising:
   initiating, on the computing device, a virtual assistant, wherein the virtual assistant is configured to provide first audio for conducting an audible conversation between a user and the virtual assistant;
   identifying that an accessibility assistant is reading an element of a user interface of the computing device and that the accessibility assistant is providing second audio of an audible description of the reading of the element of the user interface, wherein the virtual assistant and the accessibility assistant are implemented via separate applications;
   in response to the virtual assistant entering an active state, preventing the accessibility assistant from reading the element of the user interface such that the accessibility assistant does not generate the second audio, wherein the virtual assistant prevents the accessibility assistant from reading the element of the user interface; and
   upon transition of the virtual assistant from the active state, enabling the accessibility assistant to read the element of the user interface.

2. The method of claim 1, further comprising, based on preventing the accessibility assistant from reading the element of the user interface, conducting the audible conversation between the user and the virtual assistant including receiving verbal user input with the virtual assistant and generating the first audio with the virtual assistant.

3. The method of claim 2, wherein the audible conversation between the user and the virtual assistant is conducted through at least a microphone and a speaker associated with the computing device.

4. The method of claim 1, wherein the virtual assistant is implemented via a third-party application operating on the computing device.

5. The method of claim 4, wherein the accessibility assistant is implemented via a native application of the computing device.

6. The method of claim 5, wherein the accessibility assistant is included in an operating system of the computing device.

7. The method of claim 1, wherein the element of the user interface is displayed on a display screen of the computing device by an application.

8. The method of claim 7, wherein the application comprises the virtual assistant.

9. The method of claim 1, wherein preventing includes, with the virtual assistant using an application programming interface of the computing device, ceasing operation of the accessibility assistant.

10. The method of claim 1, wherein preventing includes providing, with the virtual assistant, strings to the accessibility assistant for the accessibility assistant to read that are null.

11. The method of claim 1, wherein the accessibility assistant comprises a text-to-speech (TTS) assistant that reads aloud a description of a user interface feature and navigates a user through features of one or more user interfaces.

12. The method of claim 11, wherein the virtual assistant comprises a curated voice assistant capable of engaging in bi-directional voice conversations with users.

13. The method of claim 12, wherein the curated voice assistant remains in an active state until a trigger is detected.

14. The method of claim 13, wherein the trigger is one or more of click of a mouse, tap on a display screen, swipe with a digital pen, swipe with a finger, or click on a key of a keyboard.

15. The method of claim 13, wherein the curated voice assistant transitions from the active state to a passive state upon detecting the trigger.

16. The method of claim 1, wherein preventing includes directing, with the virtual assistant, the accessibility assistant from the element of the user interface to a different element of the user interface that has a null value.

17. The method of claim 1, wherein the accessibility assistant is configured to audibly recite content on the user interface.

18. The method of claim 17, wherein the virtual assistant is configured to monitor for verbal commands.

19. The method of claim 18, wherein initiating the virtual assistant further includes detecting a verbal command.

20. The method of claim 18, wherein the virtual assistant is further configured to facilitate task completion.

21. The method of claim 1, wherein preventing further includes directing the accessibility assistant to a user interface element that has a null value.

22. The method of claim 1, wherein preventing further includes inhibiting audio output of the accessibility assistant.

23. The method of claim 22, wherein inhibiting the audio output of the accessibility assistant is done using an application programming interface (API) of an operating system of the computing device.

24. The method of claim 22, wherein enabling the accessibility assistant further includes enabling the audio output of the accessibility assistant.

25. A computing device comprising:
a processing system;
one or more storage media; and
instructions stored on at least one of the one or more storage media that when executed by the processing system direct the computing device to at least:
initiate, on the computing device, a virtual assistant that conducts an audible conversation between a user and the virtual assistant through at least a microphone and a speaker associated with the computing device, wherein the virtual assistant generates first audio for the audible conversation and wherein the virtual assistant is implemented via a third-party application on the computing device;
identify that an accessibility assistant is reading a feature of a user interface of the computing device and that the accessibility assistant is providing second audio of an audible description of the reading of the feature of the user interface, wherein the accessibility assistant is implemented via a native application to the computing device;
in response to the virtual assistant entering an active state, prevent the accessibility assistant from reading the feature of the user interface such that the accessibility assistant does not generate the second audio, wherein the virtual assistant prevents the accessibility assistant from reading the feature of the user interface; and
upon transition of the virtual assistant from the active state, enable the accessibility assistant to read the feature of the user interface.

26. The computing device of claim 25, wherein preventing the accessibility assistant from reading the feature of the user interface includes providing, with the virtual assistant, empty strings to the accessibility assistant for the accessibility assistant to read.

27. One or more computer-readable storage media having instructions stored thereon that, when executed by a processing system, direct the processing system of a computing device to:
initiate, on the computing device, a virtual assistant configured to provide first audio for conducting an audible conversation between a user and the virtual assistant, wherein the virtual assistant is implemented via a third-party application on the computing device;
identify that an accessibility assistant is reading an element of a user interface of the computing device and that the accessibility assistant is providing second audio of an audible description of the reading of the element of the user interface, wherein the accessibility assistant is implemented via a native application to the computing device;
in response to the virtual assistant entering an active state, prevent, the accessibility assistant from reading the element of the user interface such that the accessibility assistant does not generate the second audio, wherein the virtual assistant prevents the accessibility assistant from reading the element of the user interface; and
upon transition of the virtual assistant from an active state, enable the accessibility assistant to read the element of the user interface.

28. The one or more computer-readable storage media of claim 27, wherein the virtual assistant conducts the audible conversation through at least a microphone and a speaker associated with the computing device.

* * * * *